United States Patent
Nachiketa et al.

(10) Patent No.: US 11,731,348 B2
(45) Date of Patent: Aug. 22, 2023

(54) THREE DIMENSIONAL PRINTING SYSTEM WITH IMPROVED SURFACE PROPERTIES

(71) Applicant: LayerWise NV, Leuven (BE)

(72) Inventors: Ray Nachiketa, Leuven (BE); Paggi Umberto, Leuven (BE)

(73) Assignee: LAYERWISE NV, Leuven (BE)

( * ) Notice: Subject to any disclaimer, the term of this patent is extended or adjusted under 35 U.S.C. 154(b) by 543 days.

(21) Appl. No.: 16/914,768

(22) Filed: Jun. 29, 2020

(65) Prior Publication Data

US 2020/0406535 A1  Dec. 31, 2020

(30) Foreign Application Priority Data

Jun. 28, 2019 (EP) .................................. 19183193
Jun. 23, 2020 (EP) .................................. 20181684

(51) Int. Cl.
| | | |
|---|---|---|
| *B29C 64/153* | (2017.01) | |
| *G06T 19/00* | (2011.01) | |
| *B29C 64/386* | (2017.01) | |
| *B22F 10/28* | (2021.01) | |
| *B22F 10/366* | (2021.01) | |

(Continued)

(52) U.S. Cl.
CPC ............ *B29C 64/153* (2017.08); *B22F 10/28* (2021.01); *B22F 10/366* (2021.01); *B22F 10/80* (2021.01); *B29C 64/386* (2017.08); *G06T 19/00* (2013.01); *B22F 10/36* (2021.01); *B33Y 10/00* (2014.12); *B33Y 50/00* (2014.12); *G03F 7/70416* (2013.01)

(58) Field of Classification Search
CPC ... B29C 64/153; B29C 64/386; B29C 64/393; B22F 10/28; B22F 10/366; B22F 10/80; B22F 10/36; G06T 19/00; B33Y 10/00; B33Y 50/00; B33Y 50/02; B33Y 30/00; G03F 7/70416; G06F 30/10; G06F 2113/10; G05B 2219/49023; Y02P 10/25
USPC ......................................................... 700/118
See application file for complete search history.

(56) References Cited

U.S. PATENT DOCUMENTS

| | | | | |
|---|---|---|---|---|
| 6,558,606 B1 * | 5/2003 | Kulkarni | ................ | B33Y 10/00 264/401 |
| 9,358,635 B2 | 6/2016 | Bruck | | |

(Continued)

FOREIGN PATENT DOCUMENTS

| | | |
|---|---|---|
| DE | 10 2017 212 110 A1 | 1/2019 |
| DE | 10 2017 126 624 A1 | 5/2019 |

(Continued)

OTHER PUBLICATIONS

Extended European Search Report for European Application No. 20181684.0 dated Dec. 11, 2020 (11 pages).

*Primary Examiner* — Michael J Brown (57) ABSTRACT

A system for manufacturing a three-dimensional article includes a controller. The controller is configured to: (a) receive an input file defining a solid body; (b) slice the solid body into horizontal slices; (c) analyze the sliced body to identify downward-facing slice regions, a downward-facing slice region intersects with a downward-facing surface of the solid body; (d) for the individual slices, define a contour region to span a Boolean union between a default lateral peripheral contour and the downward-facing slice region; and (e) for the individual slices, define a hatch region that spans a Boolean difference between the slice and the contour region.

12 Claims, 5 Drawing Sheets

(51) Int. Cl.
    *B22F 10/80*     (2021.01)
    *B33Y 50/00*     (2015.01)
    *B33Y 10/00*     (2015.01)
    *G03F 7/00*     (2006.01)
    *B22F 10/36*     (2021.01)

(56) References Cited

U.S. PATENT DOCUMENTS

| | | |
|---|---|---|
| 9,533,372 B2 | 1/2017 | O'Neill |
| 9,879,497 B2 | 1/2018 | Pendleton et al. |
| 10,112,260 B2 | 10/2018 | Crear et al. |
| 10,399,146 B2 | 9/2019 | Giuletti |
| 10,611,091 B2 | 4/2020 | Sterenthal et al. |
| 10,722,943 B2 | 7/2020 | Versluys et al. |
| 11,090,867 B2 | 8/2021 | Miki et al. |
| 2018/0272611 A1 | 9/2018 | Cantzler et al. |
| 2020/0130056 A1 | 4/2020 | Geisen |
| 2020/0269352 A1* | 8/2020 | Maurer ................ B23K 26/082 |
| 2020/0353679 A1 | 11/2020 | Geisen |

FOREIGN PATENT DOCUMENTS

| | | |
|---|---|---|
| DE | 102017126624 A1 | 5/2019 |
| EP | 3 127 635 A1 | 2/2017 |
| EP | 3127635 A1 | 2/2017 |
| EP | 3 461 571 A1 | 4/2019 |
| EP | 3461571 A1 | 4/2019 |
| WO | 2018109734 | 6/2018 |
| WO | 2018177553 A1 | 10/2018 |
| WO | 102017212110 A1 | 1/2019 |

\* cited by examiner

FIG. 6 form a three dimensional article of manufacture from powdered materials. Each layer of powdered material is selectively fused using an energy beam such as a laser, electron, or particle beam. Higher productivity printers can utilize multiple energy beams. One challenge with these systems is a quality of surfaces and underlying subsurfaces for certain surface orientations.

THREE DIMENSIONAL PRINTING SYSTEM WITH IMPROVED SURFACE PROPERTIES

CROSS REFERENCE TO RELATED APPLICATIONS

This application claims priority to and the benefit of European Patent Application No. 19183193.2 filed in the European Patent Office on Jun. 28, 2019 and European Patent Application No. 20181684.0 filed in the European Patent Office on Jun. 23, 2020, the entire contents of which are incorporated herein by reference.

FIELD OF THE INVENTION

The present disclosure concerns an apparatus and method for a layer-by-layer fabrication of three dimensional (3D) articles utilizing powder materials. More particularly, the present disclosure concerns a system and method that improves surface and subsurface quality of the articles.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused using an energy beam such as a laser, electron, or particle beam. Higher productivity printers can utilize multiple energy beams. One challenge with these systems is a quality of surfaces and underlying subsurfaces for certain surface orientations.

DE 10 2017 126624 discloses a method for the generative production of a three-dimensional article from a powder. Therein, a layer structure model of the article to be manufactured is divided into a core region and an shell region adjoining the core region, whereby the shell region forms at least a portion of the surface of the three-dimensional article. A layer-based irradiation process is then carried out, in which a density of irradiated powder layers in the shell region is lower than in the core region.

EP 3 127 635 discloses a method for radiation based additive manufacturing of a three-dimensional article from powdered material, wherein a plurality of layers of the powdered material are and are irradiated layer by layer. Therein, the plurality of layers comprises an overhang layer with a core region and a down-surface region for forming a core portion and an overhang portion of the manufactured three-dimensional article. Therein, the energy density in the down-surface region is different to an energy density of the core region.

EP 3 461 571 discloses a method for providing data for additive manufacturing of a three-dimensional article from powdered material, the method comprising: providing a predefined component geometry for the article; dividing the article geometry into at least one first layer and an overlying second layer for additive production, wherein a contour of the second layer is incongruent with a contour of the first layer; and continuously defining at least one production parameter for additively producing the second layer in a region of a molten bath of a contour of the first layer.

SUMMARY

In a first aspect of the disclosure, a system for manufacturing a three-dimensional article includes a controller. The controller is configured to: (a) receive an input file defining a solid body; (b) slice the solid body into horizontal slices to define a sliced body; (c) analyze the sliced body to identify downward-facing slice regions, a downward-facing slice region intersects with a downward-facing surface of the solid body; (d) for the individual slices, define a contour region to span a Boolean union between a default lateral peripheral contour and the downward-facing slice region; (e) for the individual slices, define a hatch region that spans a Boolean difference between the slice and the contour region; (f) defining in the contour region scan paths of one or more energy beams generally aligned with the boundary; and (g) defining in the hatch region scan paths of one or more energy beams in a back-and-forth hatch pattern.

In one implementation the system further includes a powder dispenser for dispensing individual layers of powder and a fusing apparatus for generating and scanning one or more energy beams to selectively fuse the layers of powder. The controller is configured to operate the powder dispenser and the fusing apparatus according to laser scan paths pursuant to the defined hatch region and contour region in a layer-by-layer manner.

In another implementation, contour region further spans a Boolean union with N slice regions directly above the downward-facing slice region. N is at least equal to one. N can be at least equal to two, three, our four.

In yet another implementation the downward-facing surface defines a plane that subtends an angle with a horizontal plane with the angle being less than a critical angle. The critical angle can be less than 45 degrees. The critical angle can be less than 30 degrees.

In a second aspect of the invention, a method for manufacturing a three dimensional article includes: (a) receiving an input file defining a solid body; (b) slicing the solid body into horizontal slices to define a sliced body; (c) analyzing the sliced body to identify downward-facing slice regions, a downward-facing slice region is an intersection of a slice with a downward-facing surface of the solid body; (d) for the individual slices, defining a contour region to span a Boolean union between a default lateral peripheral contour and the downward-facing slice region; (e) for the individual slices, defining a hatch region that spans a Boolean difference between the slice and the contour region; (f) defining in the contour region scan paths of one or more energy beams generally aligned with the boundary; and (g) defining in the hatch region scan paths of one or more energy beams in a back-and-forth hatch pattern.

In a third aspect of the invention, a computer-readable storage medium is for manufacturing a three-dimensional article. The computer-readable storage medium is non-transitory and has computer-readable code portions stored therein. In response to execution by a processor the computer-readable code portions causes an apparatus to perform steps including: (a) receive an input file defining a solid body; (b) slice the solid body into horizontal slices to define a sliced body; (c) analyze the sliced body to identify downward-facing slice regions, a downward-facing slice region is an intersection of a slice with a downward-facing surface of the solid body; (d) for the individual slices, define a contour region to span a Boolean union between a default lateral peripheral contour and the downward-facing slice region; (e) for the individual slices, define a hatch region that spans a Boolean difference between the slice and the contour region; (f) defining in the contour region scan paths of one or more energy beams generally aligned with the boundary; and (g) defining in the hatch region scan paths of one or more energy beams in a back-and-forth hatch pattern.

DETAILED DESCRIPTION OF THE PREFERRED EMBODIMENTS

Figure 1:
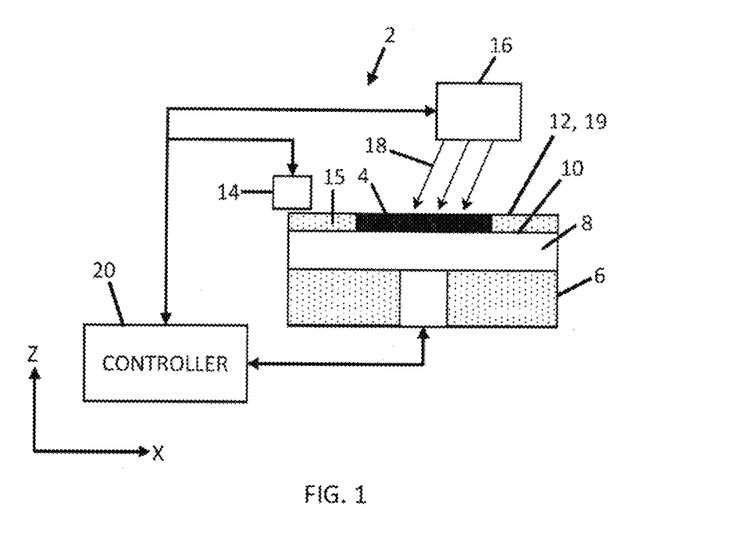
FIG. 1 is a block diagram schematic of a three-dimensional printing system for fabricating a three-dimensional article.

FIG. 1 is a block diagram schematic of a three-dimensional printing system 2 for fabricating a three-dimensional article 4. In describing system 2, mutually orthogonal axes X, Y, and Z can be used. Axes X and Y are lateral axes and generally horizontal. Additionally, mutually orthogonal lateral axes S and T can be used. Axis S is used to describe a variable direction along a contour. The axis T is transverse to S. Axis Z is a vertical axis that is generally aligned with a gravitational reference. By "generally" we mean that a measure such as a quantity, a dimensional comparison, or an orientation comparison is by design and within manufacturing tolerances but as such may not be exact.

System 2 includes a build module 6 having a motorized platform 8. The motorized platform 8 has a support surface 10 upon which the three-dimensional article 4 is formed. The motorized platform 8 is configured to vertically position an upper surface 12 (either the upper surface of article 4 or surface 10) at an optimal height to allow a powder dispenser 14 to dispense a layer of powder 15 onto the upper surface 12. In an illustrative embodiment, the motorized platform 8 will be lowered before or after a layer of powder 15 is dispensed.

In an illustrative embodiment, the dispenser 14 dispenses layers of metal powder upon the motorized support 8. The layers can be any practical thickness but a typical layer thickness can be in a range of 10 to 100 microns. More particularly, a typical thickness can be in a range of 20 to 50 microns.

A fusing apparatus 16 is configured to form and scan a plurality of energy beams 18 over the upper surface 12 of dispensed powder 15 to selectively fuse the powder 15. An energy beam 18 can be a high powered optical beam, a particle beam, or an electron beam. For a fusion of metal powder, a laser that outputs a beam having a power level of more than 100 watts is typical. Some lasers can output 500 watts, 1000 watts, or more than a kilowatt. The fusing apparatus 16 can include a laser, forming optics and scanning optics for forming and scanning the laser beam 18 over the surface 12.

In an embodiment, the plurality of energy beams 18 includes at least a first beam and a second beam. The plurality of energy beams can additionally include a third beam, or any number of beams. The plurality of energy beams 18 can individually be controlled and scanned independently and concurrently. The fusing apparatus 16 is configured to scan the energy beams over a laterally extending "build plane" 19 which is generally proximate to the upper surface 12 of the dispensed powder 15. The build plane 19 defines a lateral extent over which the plurality of energy beams 18 can operate. In a preferred embodiment, at least one of the energy beams 18 can address the entire build plane 19. In some embodiments, more than one energy beam 18 can individually address the entire build plane 19.

The motorized platform 8, the powder dispenser 14, and the fusing apparatus 16 are all under control of a controller 20. The controller 20 includes a processor coupled to an information storage device. The information storage device includes a non-transitory or non-volatile storage device that stores software instructions. When executed by the processor, the software instructions control various portions of system 2 including the motorized platform 8, the powder dispenser 14, and the fusing apparatus 16. The software instructions are also referred to as computer-readable code portions. The information storage device is also referred to as a computer-readable storage medium.

The controller 20 can be an integrated module or it can include a plurality of computers that are electrically or wirelessly coupled to one another. In a particular embodiment, the controller 20 includes a local controller that is physically integrated with other portions of system 2, a host computer, and a remote server. When the controller 20 is distributed among multiple computers, there can therefore be distributed processors and information storage devices that are accessed and utilized during the operation of the controller 20.

In an embodiment, the controller 20 manufactures the three-dimensional article 4 with the following steps: (1) receive and process an input file defining a solid body; (2) position the upper surface 12 at the build plane 10; (3) dispense a layer of powder 15 upon the upper surface 12; (4) operate the fusing apparatus 16 to selectively fuse the dispensed layer of powder 15; (5) repeat steps (2)-(4) to complete fabrication of the three-dimensional article 4. In some embodiments, step (1) can be performed in the same physical computer as steps (2)-(5). In other embodiments, at least a portion of step (1) can be performed in a separate physical computer and there may be a considerable temporal delay between execution of step (1) and execution of steps (2)-(5).

Figure 2:
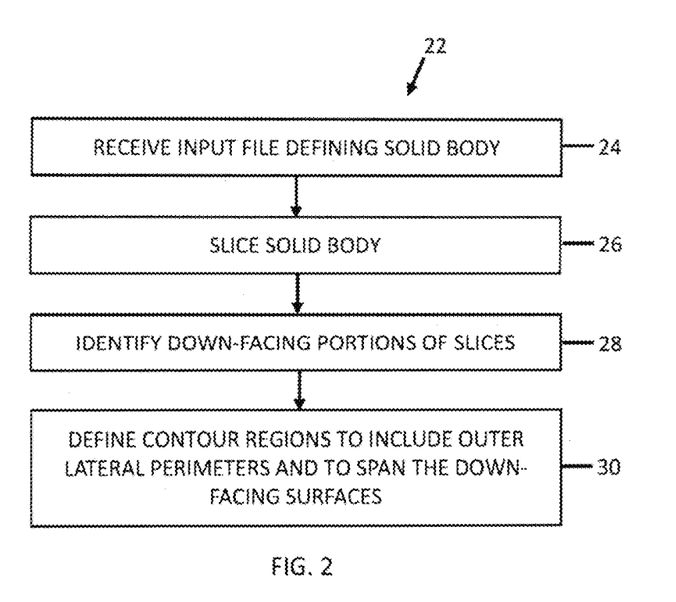
FIG. 2 is a flowchart depicting a method for receiving and processing an input file.

FIG. 2 is a flowchart depicting a method 22 for receiving and processing an input file. Method 22 can be performed "offline" before a printing process. According to 24, controller 20 receives an input file defining a solid body representing an article 4 to be manufactured. According to 26, the input file is processed to slice the solid body into horizontal slices which defines a sliced body. According to 28, the sliced body is analyzed to identify "down-facing" portions of slices. According to 30, contour regions are defined which span the down-facing portions of slices and lateral perimeters of the slices. A particular embodiment of method 22 will be elaborated infra.

Figure 3A:
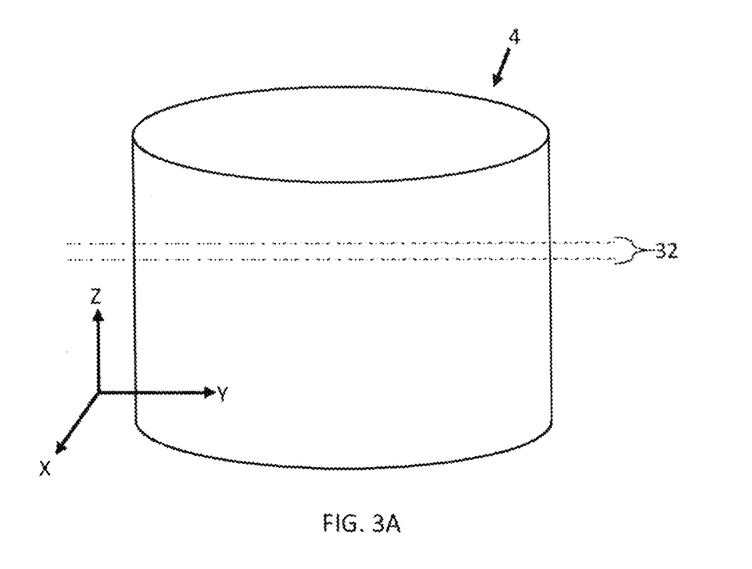
FIG. 3A is an isometric drawing of a simple cylindrical (elliptical cross-section) solid body which represents an article.
Figure 3B:
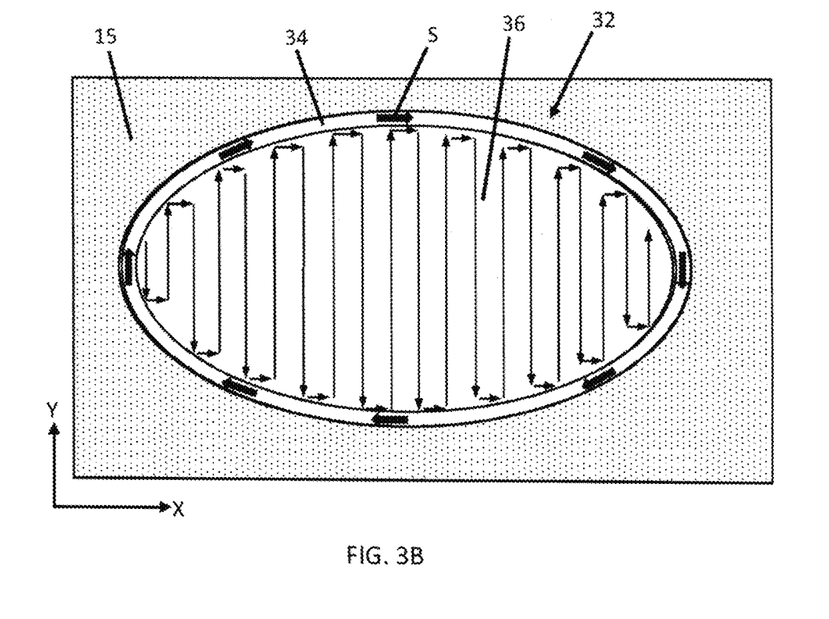
FIG. 3B is a diagram representing a lateral or horizontal slice through the solid body of FIG. 3A.

FIG. 3A is an isometric drawing of a cylindrical solid body 4 with an elliptical cross section which represents an article 4. A pair of dashed lines represents a single horizontal slice 32 that has been defined through the solid body 4. FIG. 3B is a diagram representing the slice 32. The slice 32 of the article 4 includes a solid oval of fused material within unfused powder 15.

An outer part of the slice 32 is an oval contour 34 that forms an outer boundary of the slice 32. The contour 34 is formed when an energy beam 18 is scanned along the S direction, as indicated by the solid arrows within the contour 34. The outer contour 34 is formed by one or more passes of the energy beam around and along portions of the contour 34. The contour 34 as depicted in FIG. 3B is a "default lateral peripheral contour" of the slice 32.

An inner part of the slice 32 is formed by a back-and-forth hatch pattern 36. In the illustrated embodiment, the hatch pattern 36 includes relatively larger back-and-forth scans of the beam along the Y axis and incremental movements along the X direction. In other embodiments, the larger back-and-forth scans can be along the X direction or can be at an oblique angle relative to the X and Y directions.

Generally speaking contours 34 differ from hatch patterns 36 in several ways. The following comparisons are true in the illustrated embodiment: (1) Default contours 34 define a boundary of a slice 32. A hatch pattern 36 defines an interior portion. (2) Laser motion vectors for contours 34 follow the boundary of a slice 32. Stated another way, the scan path vector for a boundary contour 34 is generally aligned with the boundary. Hatch pattern 36 vectors do not follow a boundary and sometimes define an oblique or normal angle with respect to a boundary. (3) Adjacent contour 34 vectors tend to be more or less aligned. Adjacent hatch vectors of the hatch pattern 36 are typically in opposing or opposite directions.

Figure 4A:
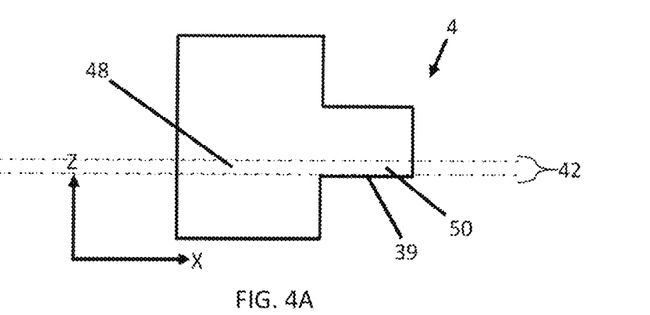
FIG. 4A is diagram depicting a solid body which has a downward-facing surface that is generally parallel with a horizontal plane.

FIG. 4A is a diagram depicting another solid body 4 which has a downward-facing surface 39. A slice 42 intersects with the downward-facing surface 39. The slice includes an interior slice region 48 that is entirely interior to the body 4 and a downward-facing slice region 50 that intersects with the lower-facing surface 39.

Figure 4B:
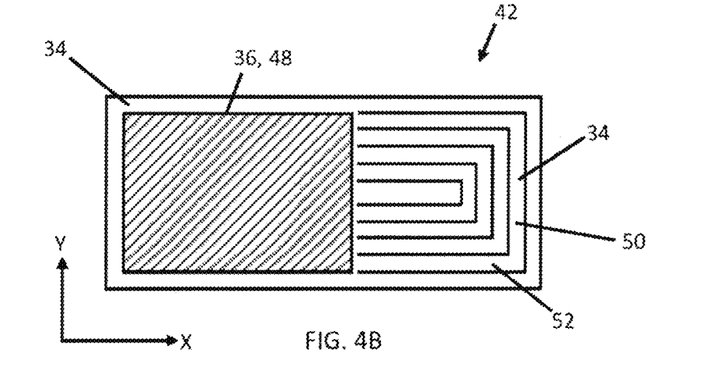
FIG. 4B is diagram depicting a horizontal slice that intersects the downward-facing surface of FIG. 4A.

FIG. 4B illustrates the slice 42 in plan view. As with slice 32, the overall slice 42 is bounded by a default contour 34. The interior slice region 48 is defined by the hatch pattern 36. However, the downward-facing slice region 50 is entirely defined by contours 34. The region 52 can be referred to as a "downfacing contour" region 50. The result is a contour region 52 for slice 42 which includes all the defined contours 34 which is a Boolean union between the default contour(s) and the downfacing contours 50. In the illustrative embodiment, the contours end at the hatch pattern 36. In other embodiments, the contoured region 50 can have a spiral pattern of contours. The spiral pattern can be formed either clockwise or anti-clockwise.

Figure 4C:
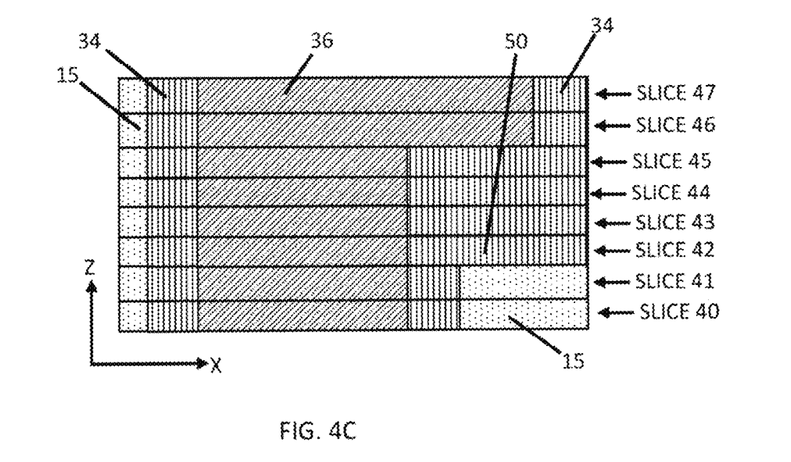
FIG. 4C is a cross-sectional view of a sequence of slices that form part of the solid body of FIG. 4A.

FIG. 4C depicts a cross section of slices 40-47 that form part of the illustrated body 4 of FIG. 4A after selective fusing has taken place. The slice numbers 40 to 47 are in order of their sequence of formation. The dotted rectangles 15 represent unfused powder. The obliquely hatched rectangles 36 represent powder that has been fused with a hatching pattern 36. The vertically hatched rectangles 34 represent powder that has been fused with a contour pattern 34.

The slice 42 of FIG. 4C in cross section view corresponds to the slice 42 of FIG. 4B. As can be seen, the right side of slice 42 is defined by contours. Also, for the next three slices (43-45) above slice 42, the slice regions directly above downwardly facing region 50 are all defined by contours.

Figure 5A:
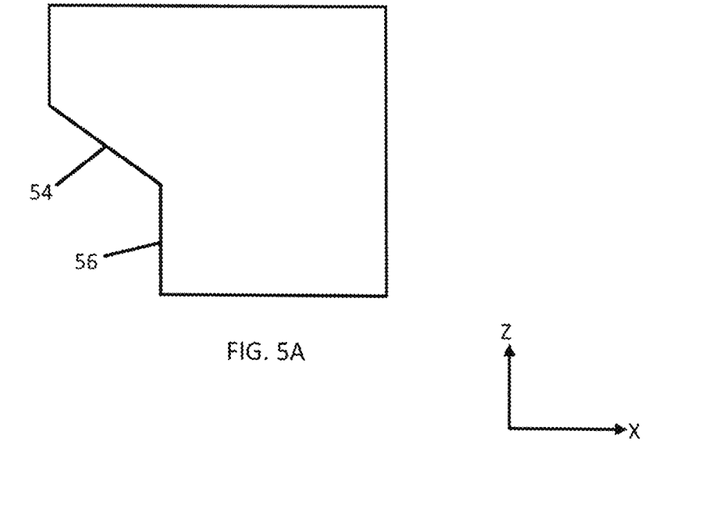
FIG. 5A is a diagram depicting a solid body that has a downward-facing surface that defines an oblique angle with a horizontal plane.

FIG. 5A illustrates a embodiment of a body 4 having an oblique downward-facing surface 54 that is not horizontal, but defines an oblique angle with respect to a horizontal plane. In general, a "downward-facing" surface 54 is any surface that defines or subtends an angle with a horizontal or lateral plane that is less than a critical angle. In one embodiment, the critical angle is 45 degrees or less. In the illustrated embodiment of FIG. 5A, the solid body also has a vertical face 56.

Figure 5B:
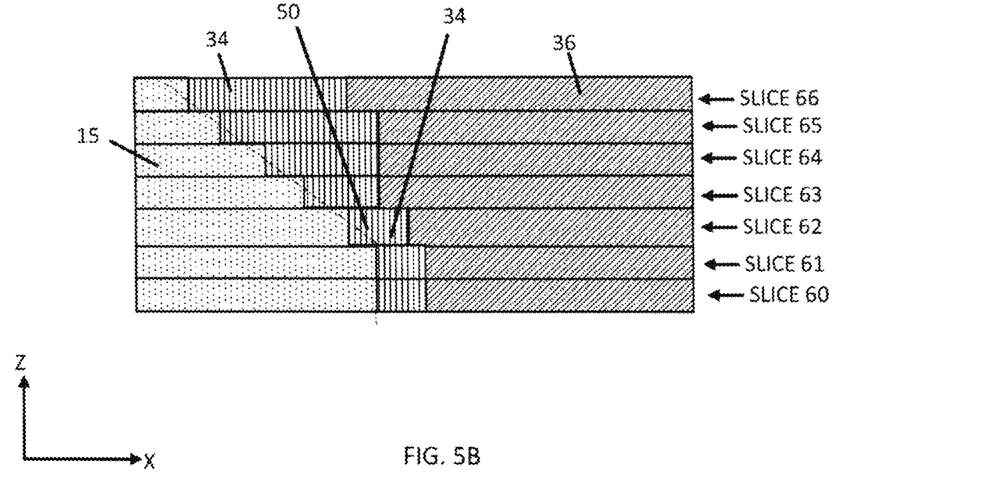
FIG. 5B is a cross-sectional view of a sequence of slices that form part of the solid body of FIG. 5A.

FIG. 5B depicts a cross section of slices 60-66 that form part of the illustrated body 4 of FIG. 5A after selective fusing has taken place. The slice numbers 60 to 66 are in order of their sequence of formation. The dotted rectangles 15 represent unfused powder. The obliquely hatched rectangles 36 represent powder that has been fused with a hatching pattern 36. The vertically hatched rectangles 34 represent powder that has been fused with a contour pattern 34.

Slices 60 and 61 correspond to a portion of the vertical face 56. Slices 62-66 correspond to the downward-facing surface 54. The contours 34 of slices 62-65 are widened to accommodate the downward-facing surface 54. Slices 63-65 include contour regions directly above the region 50 of slice 62.

Figure 6:
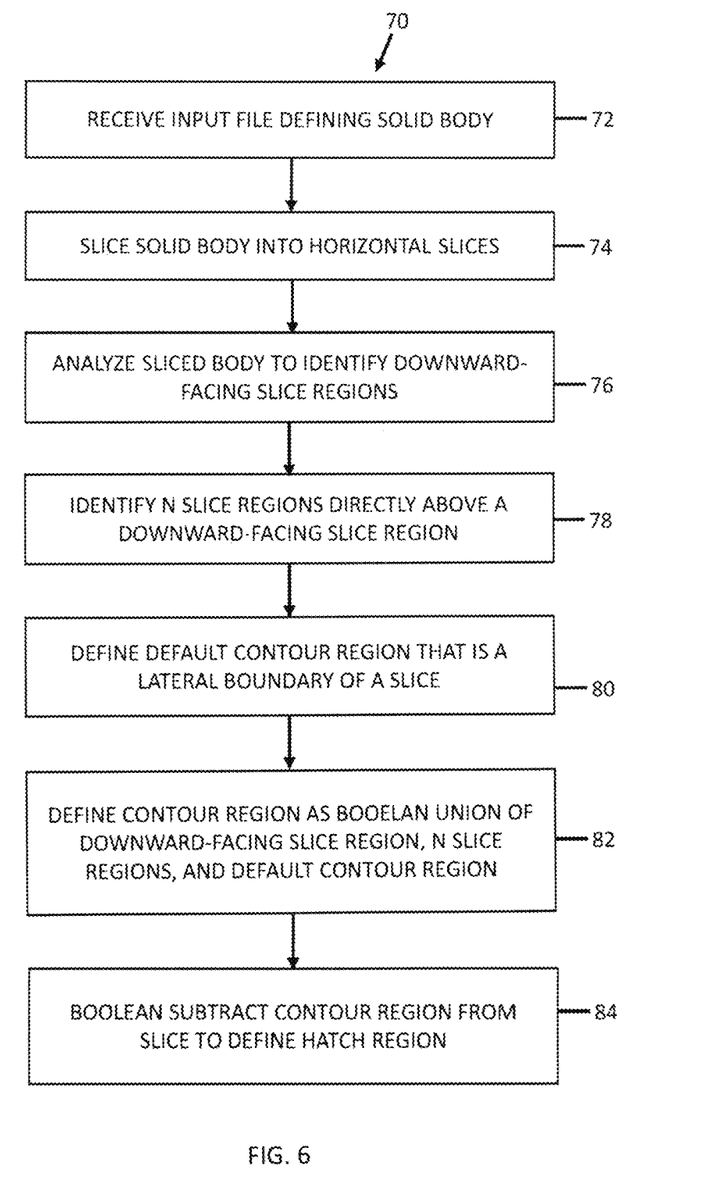
FIG. 6 is an embodiment of a method for processing data to define scan paths for energy beams for individual slices of a solid body.

FIG. 6 is a flowchart of an embodiment of a method 70 for processing data to define scan paths for the energy beams 18 for forming slices. According to 72, an input file is received that defines a solid body 4. According to 74, the solid body is sliced into horizontal slices to define a sliced body 4.

According to 76, the sliced body 4 is analyzed to identify downward-facing slice regions 50. As discussed supra, a downward-facing slice region 50 intersects or borders with a downward-facing surface of the body 4. A downward-facing surface of the body 4 is any surface defining an angle that is less than a critical angle with respect to a horizontal plane. Examples of such downward-facing surfaces include surface 39 of FIG. 4A and surface 54 of FIG. 5A. In FIGS. 4A-4C, slice 42 includes the downward-facing slice region 50. In FIG. 5B, all of slices 62-66 includes downward-facing slice regions 50.

According to 78, N contour slice regions are identified above a downward-facing slice region. N is at least equal to one and can equal two, three, four, more. In the illustrated embodiment of FIG. 4C, N equals three because there are three contoured regions directly above the downward-facing slice region 50 of slice 42. In the illustrated embodiment of FIG. 5B, N=3.

According to 80, a default contour region 34 is defined as a lateral boundary of fused material for a slice. Examples of a default contour region 34 include the contour 34 of FIG. 3B and the contour 34 of FIG. 4B. The default boundary laterally bounds the region of a slice to be fused.

According to 82, a contour region 52 of each slice is defined that is a Boolean union of the default contour region 34 of the respective slice, the downward-facing slice region of the respective slice 50, and it may include the contour slice region defined above a downward-facing slice region 50 if within the N contour slice regions above a downward-facing slice region. According to 84, a hatch region 36 is defined for each slice that is the Boolean difference between the entire area of the respective slice to be fused minus the contour region 52.

The specific embodiments and applications thereof described above are for illustrative purposes only and do not preclude modifications and variations encompassed by the scope of the following claims.

What is claimed:

1. A system for manufacturing a three-dimensional article comprising:
 a powder dispenser (14) for dispensing individual layers of powder;
 a fusing apparatus (16) for generating and scanning one or more energy beams to selectively fuse the layers of powder; and
 a controller (20) configured to:
  receive an input file defining a solid body (4);
  slice the solid body (4) into horizontal slices (32, 42) to define a sliced body;
  analyze the sliced body to identify downward-facing slice regions (50), a downward-facing slice region (50) intersects with a downward-facing surface (39) of the solid body (4);
  for the individual slices (32, 42), define a contour region (34) to span a Boolean union between a default lateral peripheral contour and the downward-facing slice region (50);
  for the individual slices, define a hatch region that spans a Boolean difference between the slice (32, 42) and the contour region (34),
  define in the contour region (34) scan paths of one or more energy beams (18) generally aligned with the boundary;
  define in the hatch region scan paths of one or more energy beams (18) in a back-and-forth hatch pattern (36); and
  operate the powder dispenser (14) and the fusing apparatus (16) according to laser scan paths pursuant to the defined hatch region and contour region in a layer-by-layer manner.

2. The system of claim 1 wherein, for individual slices, the contour region (34) further spans a Boolean union with N slice regions directly above the downward-facing slice region (5), wherein N is at least equal to one or wherein N is at least equal to two.

3. The system of claim 1 wherein the downward-facing surface (39) defines a plane that subtends an angle with a horizontal plane that is less than a critical angle, wherein the critical angle is less than 45 degrees or wherein the critical angle is less than 30 degrees.

4. A method of manufacturing a three-dimensional article comprising:
 receiving an input file defining a solid body (4);
 slicing the solid body (4) into horizontal slices (32,42) to define a sliced body;
 analyzing the sliced body to identify downward-facing slice regions (50), a downward-facing slice region (50) is an intersection of a slice (32, 42) with a downward-facing surface (39) of the solid body (4);
 for the individual slices (32, 42), defining a contour region (34) to span a Boolean union between a default lateral peripheral contour and the downward-facing slice region (50);
 for the individual slices (32, 42), defining a hatch region that spans a Boolean difference between the slice (32, 42) and the contour region (34);
 defining in the contour region (34) scan paths of one or more energy beams (18) generally aligned with the boundary;
 defining in the hatch region scan paths of one or more energy beams (18) in a back-and-forth hatch pattern (36); and
 operating a powder dispenser (14) and a fusing apparatus (16) with laser scan paths pursuant to the defined hatch region and contour region (34).

5. The method of claim 4 further comprising defining N slice regions directly above the downward-facing slice region (50), wherein the contour region (34) spans a Boolean union between the default lateral peripheral contour, the downward-facing slice region (50), and the N slice regions.

6. The method of claim 5 wherein N is at least equal to two.

7. The method of claim 4 wherein the downward-facing surface (39) defines a plane that subtends an angle with a horizontal plane that is less than a critical angle, wherein the critical angle is less than 45 degrees or wherein the critical angle is less than 30 degrees.

8. A computer-readable storage medium for manufacturing a three-dimensional article, the computer-readable storage medium being nontransitory and having computer-readable code portions stored therein that in response to execution by a processor cause an apparatus to perform steps comprising:
 receive an input file defining a solid body (4);
 slice the solid body into horizontal slices (32, 42) to define a sliced body;
 analyze the sliced body to identify downward-facing slice regions (50),
 wherein a downward-facing slice region (50) is an intersection of a slice (32, 42) with a downward-facing surface (39) of the solid body (4);
 for the individual slices (32, 42), define a contour region (34) to span a Boolean union between a default lateral peripheral contour and the downward-facing slice region (50);
 for the individual slices (32, 42), define a hatch region that spans a Boolean difference between the slice (32,42) and the contour region (34);
 defining in the contour region (34) scan paths of one or more energy beams (18) generally aligned with the boundary;
 defining in the hatch region scan paths of one or more energy beams (18) in a back-and-forth hatch pattern (36); and
 operate a powder dispenser (14) and a fusing apparatus (16) with laser scan paths pursuant to the defined hatch region and contour region (34).

9. The computer-readable storage medium of claim 8 wherein in response to execution by the processor the apparatus defines N slice regions directly above the downward-facing slice region (50), wherein the contour region (34) spans a Boolean union between the default lateral peripheral contour, the downward-facing slice region (50), and the N slice regions.

10. The computer-readable storage medium of claim 9 wherein N is at least equal to two.

11. The computer-readable storage medium of claim 8 wherein the downward-facing surface (39) defines a plane that subtends an angle with a horizontal plane that is less than a critical angle, wherein the critical angle is less than 45 degrees.

12. The computer-readable storage medium of claim 11 wherein the critical angle is less than 30 degrees.

* * * * *